United States Patent [19]
Chen et al.

[11] Patent Number: 5,584,277
[45] Date of Patent: Dec. 17, 1996

[54] FUEL DELIVERY SYSTEM WITH WALL WETTING HISTORY AND TRANSIENT CONTROL

[75] Inventors: Gang Chen, Madison Heights; Michael T. Vincent, Novi; Terry R. Gutermuth, St. Clair Shores; Michael W. Weglarz, Macomb, all of Mich.

[73] Assignee: Chrysler Corporation, Auburn Hills, Mich.

[21] Appl. No.: 534,070

[22] Filed: Sep. 26, 1995

[51] Int. Cl.$^6$ ..................................................... F02D 41/32
[52] U.S. Cl. ............................................ 123/480; 123/492
[58] Field of Search .................................... 123/480, 492, 123/493

[56] References Cited

U.S. PATENT DOCUMENTS

| | | | |
|---|---|---|---|
| 4,357,923 | 11/1982 | Hidig | 123/492 |
| 4,903,668 | 2/1990 | Ohata | 123/480 |
| 4,922,877 | 5/1990 | Nagaishi | 123/492 |
| 5,474,052 | 12/1995 | Aquino et al. | 123/492 |

*Primary Examiner*—Andrew M. Dolinar
*Attorney, Agent, or Firm*—Mark P. Calcaterra

[57] ABSTRACT

The fuel delivery control system monitors engine speed and load parameters to develop a wall wetting history that is indicative of the physical state of the fuel within the intake port or intake manifold. The wall wetting history is used along with engine speed, temperature and pressure measurements to determine the pulse width of the fuel injector signal. Fuel to air ratio is thereby optimized. Transient conditions due to changes in engine load or due to acceleration and deceleration are used to generate a pulse width correction signal to optimize performance on a cycle by cycle basis. Each engine cylinder injector may be independently controlled.

29 Claims, 4 Drawing Sheets

FUEL DELIVERY SYSTEM WITH WALL WETTING HISTORY AND TRANSIENT CONTROL

BACKGROUND AND SUMMARY OF THE INVENTION

The present invention relates generally to fuel delivery systems. More particularly, the invention relates to a system for controlling the quantity of fuel injected in a fuel injection system for an internal combustion engine. The system takes into account the fuel intake port wall wetting history and other transient conditions to achieve optimal air to fuel ratio.

Internal combustion engines operate most efficiently and with minimal pollution when the correct fuel to air ratio is maintained. This is easier said than done, because transient conditions during engine operation make it difficult to determine the precise quantity of fuel that should be injected at any given instant. In a present-day fuel injection system fuel is injected into the intake port of the fuel intake manifold. There the fuel is mixed with air and introduced into the cylinder when the intake valve is opened. Present-day fuel injection systems use microprocessor-based computer systems to determine the quantity of fuel injected into the intake manifold. Conventionally, the microprocessor-based fuel injection system monitors engine speed (RPM) and engine load (e.g., manifold pressure and manifold temperature) and the appropriate quantity of fuel is then injected based on a predetermined fuel to air ratio for the measured parameters.

The problem with conventional microprocessor-based fuel injection systems is that they do not accurately take into account what is actually happening for the fuel wall wetting in the engine during operation. When fuel is sprayed from the injector into the intake manifold, some of the fuel will deposit on the walls of the manifold as a liquid film. Although some of the fuel in the film may vaporize and thereafter enter the cylinder, the rest remains on the manifold wall and forms a liquid flow. Also, some of the unvaporized liquid fuel that enters the cylinder may not be fully burned during the combustion cycle. This unburned fuel is thus ejected as waste during the exhaust cycle and this waste fuel therefore produces no power and contributes to increased emissions. Thereafter, on subsequent cycles, some of the fuel previously deposited on the manifold wall may vaporize or migrate as a liquid and enter the cylinder, adding to the quantity of fuel injected for use during that cycle.

The net result is that the quantity of fuel that is actually consumed during the combustion on cycle will vary depending on transient operating conditions. Conventional fuel injection systems have not accurately taken this variance into account. To further complicate matters, the operator of the vehicle may, at any time, change the throttle setting (by accelerating or decelerating) or the engine load may change (going up and down hills) and this will change the instantaneous fuel requirements due to the wall wetting. Conventional microprocessor-based systems do not accurately take these transient conditions into account.

The present invention addresses these problems. The invention provides a system for controlling fuel quantity that takes into account the intake port wall wetting history to determine the precise quantity of fuel to be injected during any given cycle. The invention employs an engine speed sensor for reading the engine speed of the internal combustion engine. The system also employs an engine load sensor for reading the engine load of the internal combustion engine. Additionally, the system employs a fuel quantity selector that controls the quantity of fuel injected into the engine. A history generator, coupled to the fuel quantity selector, generates a fuel intake port wall wetting history based on parameters such as engine speed, engine temperature and engine load. The fuel quantity selector uses the fuel spray vapor fraction, the wall wetting history as well as the engine speed and engine load parameters to determine the quantity of fuel needed for the given injection cycle. By taking the wall wetting history into account for each individual cylinder, the present system is able to supply the proper quantity of fuel for each injection cycle. This results in higher efficiency and cleaner burning.

For a more complete understanding of the invention, its objects and advantages, reference may be had to the following specification and to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
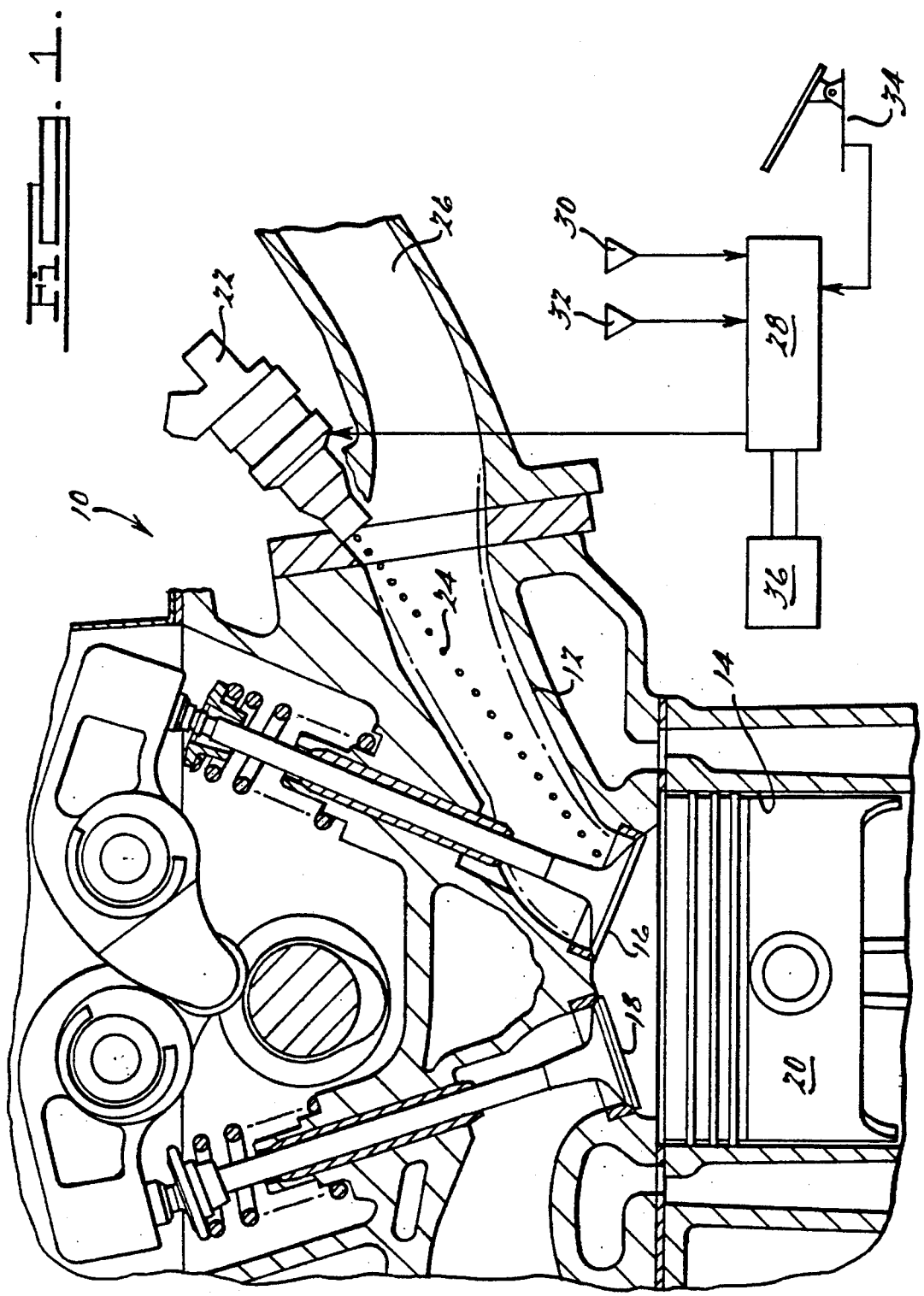
FIG. 1 illustrates an exemplary fuel intake system or fuel transport mechanism, showing the hardware components of the preferred embodiment in block diagram.

The fuel delivery system or fuel transport mechanism is illustrated in FIG. 1 generally at 10. The intake port 12 communicates with cylinder 14 through the intake valve 16. Cylinder 14 also communicates with exhaust valve 18, as illustrated. In FIG. 1 piston 20 is shown at the top of its stroke and both valves are shown closed. It will be understood that the valves 16 and 18 open and close in sequence to effect the combustion cycle.

Fuel injector 22 delivers fuel into the intake port 12 by spraying fuel droplets 24 into the intake port. These droplets mix with air that is introduced through air intake manifold 26, forming a fuel-air mixture. As will be discussed below, some of the fuel vaporizes into the gaseous phase and some remains as droplets in the liquid phase.

Fuel injector 22 is controlled by a microprocessor-based control system 28 that functions as a fuel quantity selector. The control system employs an engine speed sensor 30 and an engine load sensor 32. Although a variety of different sensors may be used, the presently preferred speed sensor measures the engine RPM and the presently preferred load sensor measures intake manifold pressure and/or intake manifold temperature. Throttle position sensor 34 is coupled to control system 28 by which the vehicle operator can accelerate or decelerate the engine. The microprocessor-based control system 28 generates and then utilizes a wall wetting history that may be stored in memory 36. The details of how this wall wetting history is generated and used are described below.

The presently preferred fuel delivery system uses a pulse. The fuel pulse width modulated signal is used to control the fuel injector 22. The fuel injector 22 is electrically actuated by the pulse width modulated signal that is generated by the control system or fuel quantity selector 28. The pulse width is changed or modulated to vary the amount of fuel introduced by the injector.

Figure 2:
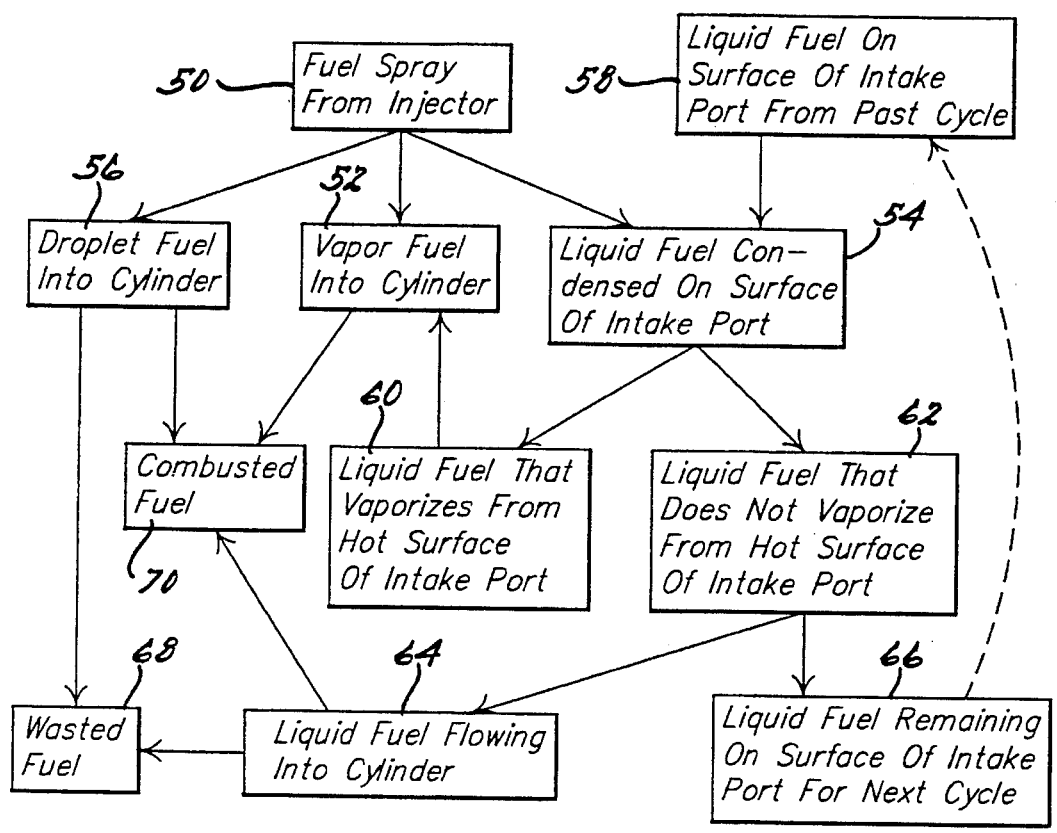
FIG. 2 is a chart describing possible physical states of the fuel inside the intake port and cylinder.

FIG. 2 illustrates the various physical states that fuel may exist in the intake port and engine cylinder, as the engine operates from cycle to cycle. Fuel is sprayed into the intake port by injector 22, as depicted at 50. Some of this fuel vaporizes and is drawn into the cylinder when the intake port opens. This is depicted at 52. Some of the fuel remains as liquid, condensed on the surface of the intake port. This is depicted at 54. Another portion of the injected fuel is deposited as fuel droplets in the cylinder itself. This is depicted at 56.

FIG. 2 represents a snapshot of the physical state of the fuel for a given engine cycle. As illustrated at 58, some of the liquid fuel condensed on the surface of the intake port comes from liquid fuel that was on the surface of the intake port from a past engine cycle or cycles. As illustrated, this additional liquid fuel contributes to the quantity of liquid fuel depicted at 54.

A portion of the fuel that is condensed on the surface of the intake port (depicted at 54) will vaporize due to the hot surface of the intake port. This is illustrated at 60. This vaporized fuel is then available to enter the cylinder as depicted at 52. That portion of the liquid fuel that is not vaporized is depicted at 62. This portion may alternatively flow as liquid fuel into the cylinder when the intake port opens (64) or it will remain on the surface of the intake port for the next cycle (66). The dotted line connecting liquid fuel 66 and liquid fuel 58 illustrates that the fuel remaining at 66 becomes the liquid fuel at 58 for a subsequent cycle.

The liquid fuel that flows into the cylinder at 64 comprises part of the wasted fuel 68 and part of the combusted fuel 70. The droplets of fuel sprayed directly into the cylinder by the injector 22 (illustrated at 56) also comprise part of the wasted fuel 68 and part of the combusted fuel 70. The present invention takes into account the wasted fuel using a liquid burn fraction value. The liquid burn fraction represents the percentage of fuel actually burned. This value is used to determine how much additional fuel will be needed to produce the desired combustion level. In other words, the liquid burn fraction takes into account the percentage of fuel that is wasted, and the quantity of fuel injected by injector 22 is therefore increased by this amount.

Figure 3A:
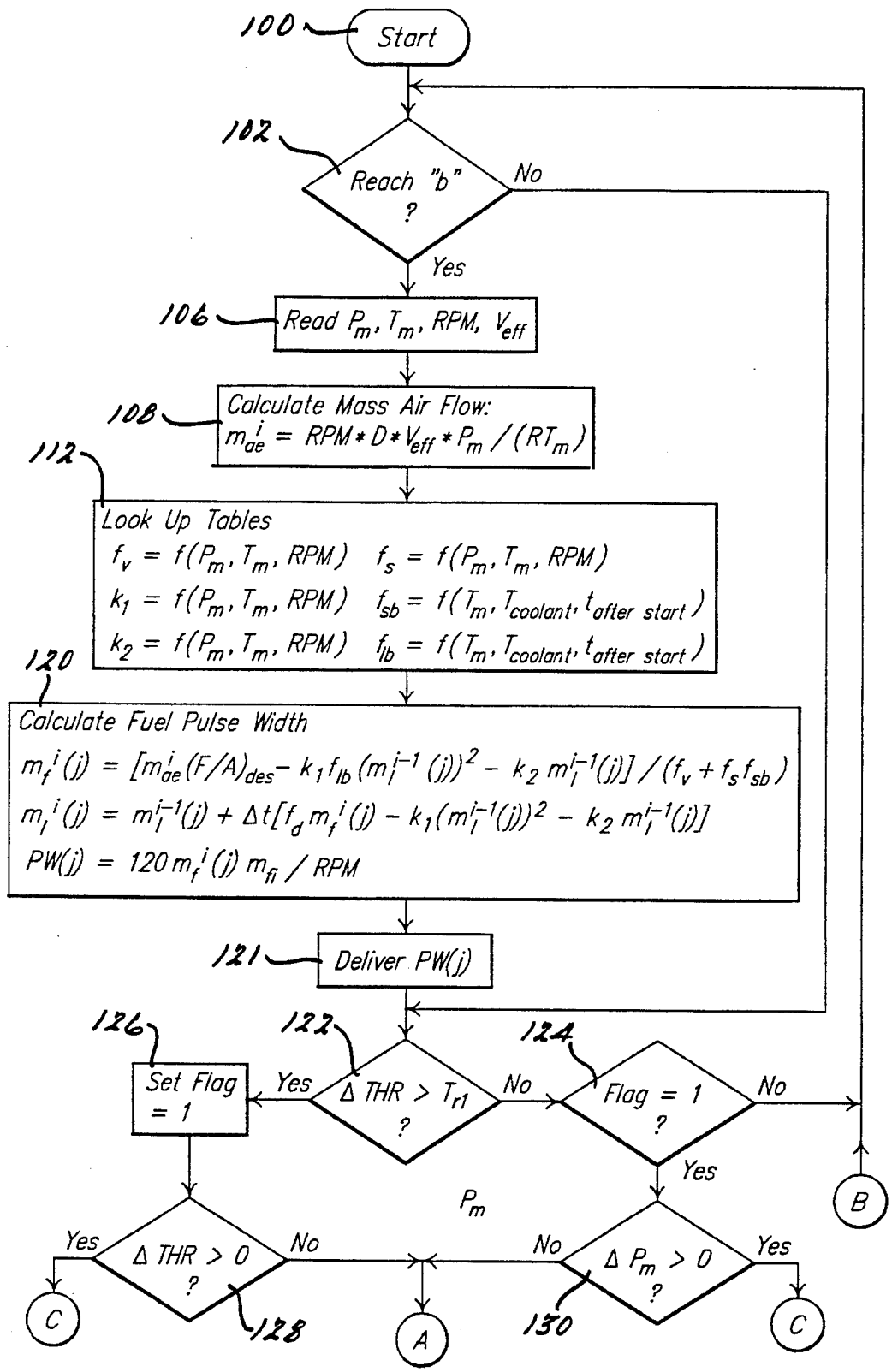
FIG. 3A and Ab are a flowchart describing the fuel quantity (pulse width) procedure used by the preferred embodiment.
Figure 3B:
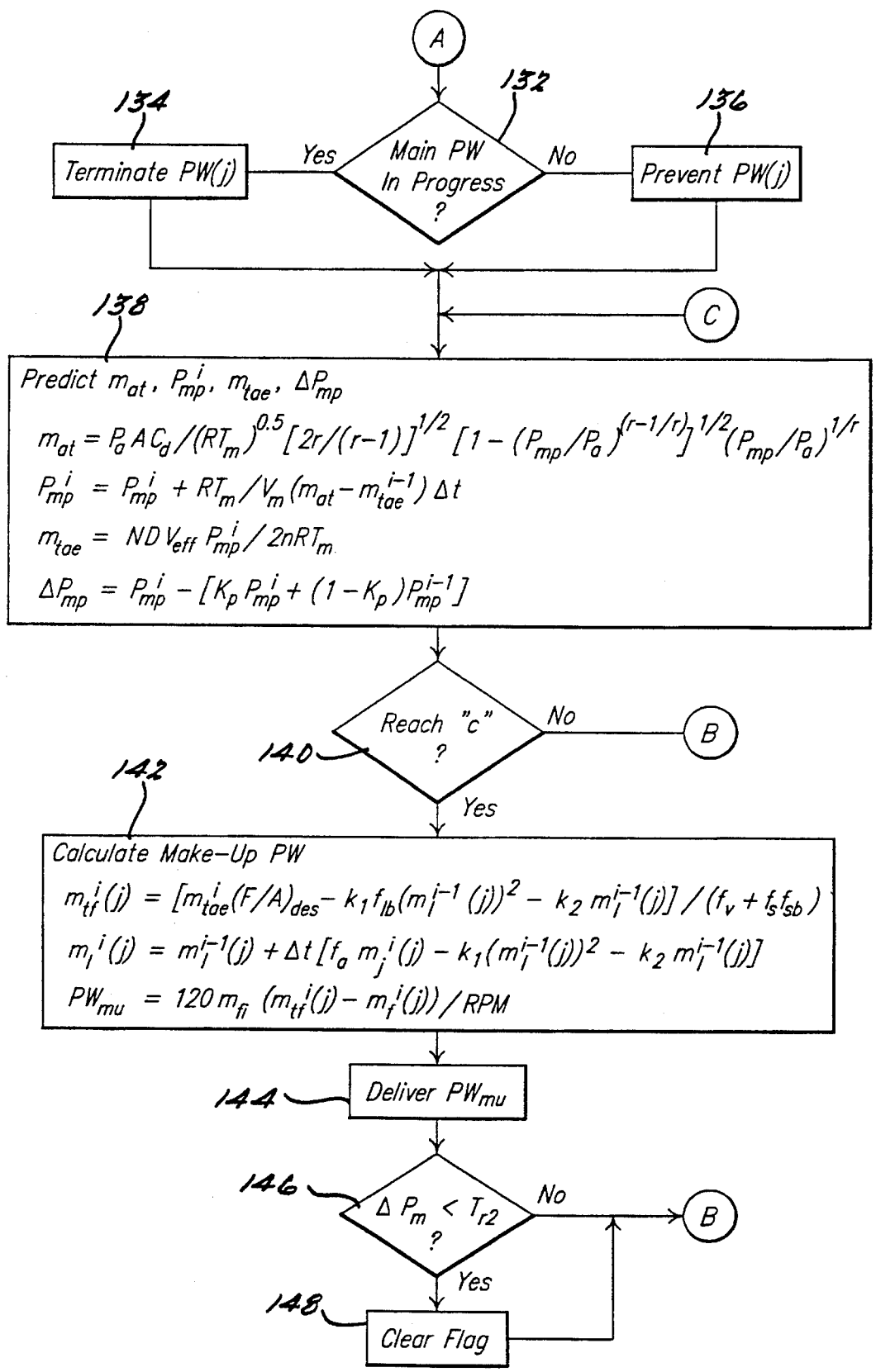

The presently preferred embodiment is preprogrammed to take these physical states into account. FIG. 3 illustrates the data used in the presently preferred embodiment to generate the pulse width that controls the quantity of fuel injected. The output of speed sensor 30 supplies an RPM signal and the throttle position sensor 34 supplies a throttle position (THR) signal. These are used to determine the air intake requirements. As illustrated, the fuel requirements are derived from the air requirements, using the absolute manifold pressure (Pam) to yield the mass of fuel to be injected into the manifold (Mfm). The microprocessor-based control system is preprogrammed to perform the procedures illustrated in the flowchart of FIG. 3.

The procedure starts at 100. A check is made at decision block 102 to determine if a pre-selected injection angle has been reached. If not true control then passes to step 122. If true, the procedure then reads the data inputs needed for the subsequent operations. As depicted at 106, the manifold pressure (Pm), the manifold air temperature (Tm), the engine RPM and the engine volumetric efficiency (Veff) are measured or determined from a look-up table. Next, the mass of the air in the manifold (Mae) is calculated to produce a value indicative of the airflow in the intake port, at 108. The procedure next determines at step 112 the droplet vaporization effect and wall vaporization effect. Specifically, look up tables are used to obtain a value representing the vapor fraction of fuel spray from the fuel injector (fv) and the time constant for the fuel evaporation process on the surface of the intake port (K2), the liquid flow rate factor (K1), the suspended droplet fraction (fs), the liquid burn fraction (flb) and the suspended droplet burn fraction (fsb). These values are based on the measured parameters (Pm, Tm and RPM).

Referring to FIG. 2, the liquid fuel that flows directly into the cylinder is illustrated at 64. Liquid fuel also enters the cylinder directly as droplets sprayed from injector 22, as depicted at 56 in FIG. 2. In step 120 the following abbreviations are used:

flb=liquid fuel burn fraction (table look-up)

fsb=suspended fuel burn fraction (table look-up)

fs=suspended droplet fraction (table look-up)

PW=pulse width

Mfi=fuel injection rate

Ml=mass of liquid fuel film

Mf=mass flow rate of fuel j=counter that is incremented from 1 to n, to indicate the current cylinder number In step 120 the steady-state and transient operating parameters based on manifold pressure sensor and RPM readings are calculated. These values assume that there are no transients that may result from changes in load or from accelerating or decelerating. However, some transients may occur after the sensor reads. Throttle transients are taken into account in step 122. If there is a transient throttle condition recognized at a predetermined angular position T of the engine then control branches to step 126 where a transient indication flag is set and control branches to step 128. If no throttle transient is detected, then control branches to step 124 where a check of the transient indication flag is made. If the flag is clear, control simply branches back to step 102.

If the flag is set, then a check for a manifold pressure transient is made at block 130. If negative manifold pressure transient is detected then control branches to step 132. If a positive manifold pressure transient exists then control branches to step 138 where the predicted airflow parameters are calculated.

Returning to step 128, a check is made to determine if the throttle position has changed sufficiently to warrant a make-up pulse calculation. The change in throttle, Δthrottle, is analyzed to determine whether acceleration or deceleration is in progress. If the change in throttle is greater than zero, acceleration is in progress. Conversely, if the change in throttle position is not greater than zero, a deceleration is in progress. Under accelerating conditions control branches to step 138 where the predicted airflow parameters are calculated.

In decelerating conditions control branches to step 132 where the routine first tests to determine if the main pulse width is in progress. If not, control branches to step 136 where the system parameters are altered to prevent the main pulse width delivery at its normal starting point. In this way, the primary pulse is aborted and control then branches to step 138 where a make-up pulse is calculated, as a substitute for the aborted primary pulse. On the other hand, if the main pulse is already in progress at step 132, control branches to step 134, which terminates the main pulse width prematurely, as required, to yield a closer approximation of the proper pulse for the given transient conditions. Thereafter, control branches to step 138, where the system is able to further control the amount of fuel injected to meet current requirements.

In step 138 the following parameters are updated according to the transient condition detected:

Mtae=mass airflow entering at the intake port

Mat=airflow rate at the throttle

Pmp=predicted manifold pressure

ΔPmp=predicted manifold pressure rate-of-change

Make-up PW=the pulse width correction amount required to take into account the instantaneous transient conditions The control then passes to step 140 where a check is made to determine if a pre-selected make-up PW injection-angle has been reached. If not, control simply passes to step 102. If the pre-selected injection angle has been reached, control branches to step 142 where the transient-fuel flow-rate (Mtf), the liquid fuel mass on the port wall (Ml) and the make-up PW are calculated. Then control passes to step 144 where the make-up PW is delivered.

After delivery the make-up PW, control passes to step 146 where a check for a continuing manifold pressure transient (ΔPm) is made. If a manifold pressure transient exists, control simply branches back to step 102. If no manifold pressure transient exists, the control passes to step 148 where the transient indication flag is cleared and control passes back to step 102.

Figure 4:
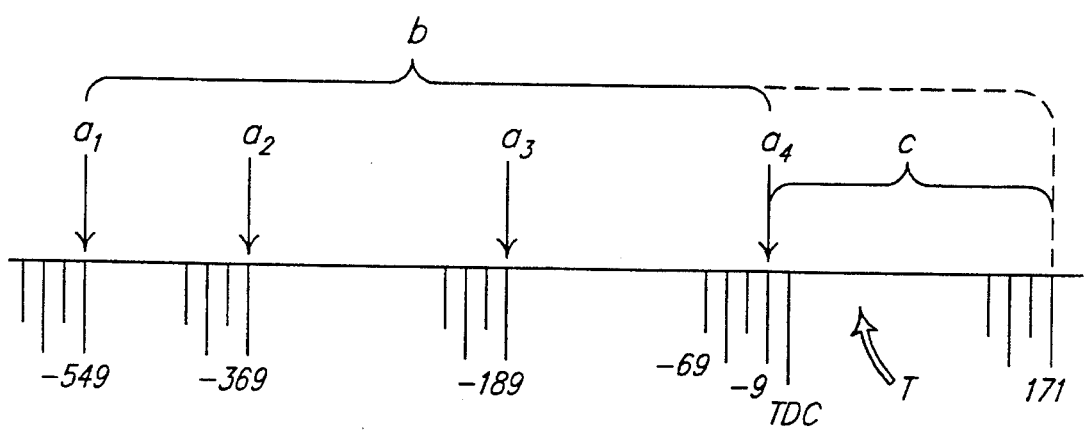
FIG. 4 is a timing diagram useful in describing the transient response of the system.

FIG. 4 is a timing diagram useful in understanding the transient behavior of the system. As previously noted, the amount of fuel delivered in any given cycle may be modified by an optional makeup pulse, if required. The decision of whether to supply the additional make-up pulse is made at a predetermined point T in the cycle. The presently preferred embodiment does this at a point between 9° before top dead center (BTDC) and 111° after top dead center (ATDC) (or, a point of region C in FIG. 4). Specifically, FIG. 4 is a timing diagram that shows selected timing indicia that occur in synchronism with the engine crankshaft. The presently preferred system is designed to work with an engine that supplies timing events at predetermined angular intervals, namely 69°, 49°, 29° and 9° before top dead center. In FIG. 4 five such sets of timing marks are illustrated. Of course, the invention is not restricted to these specific timing intervals. In general, the invention can be implemented in any automotive engine system that is capable of supplying interrupt signals in synchronism with the engine position (e.g., crankshaft). For illustration purposes, the point at which the transient test is performed, is illustrated by the arrow labeled T. The presently preferred embodiment reads inputs (step 106 of FIG. 3) at 189° before top dead center. In FIG. 4 this point is labeled by reference letter "$a_3$". A fuel pulse is thereafter injected, based on the calculated pulse width (PW) at some time thereafter within the interval designated "b". Preferably, the fuel injection signal may begin at 69° before top dead center within interval "b" and will last for a duration dictated by the pulse width (PW). An optional make-up pulse may be added to the steady-state pulse, or the steady-state pulse can be shortened for a given cycle, if the throttle position changes during the cycle. The presently preferred embodiment monitors throttle position every 2 milliseconds and then executes a make-up strategy at a point (T) within region "c" in FIG. 4, if required. Essentially, the strategy compares the speed density calculation based on predicted mass flow into the cylinder with predicted mass airflow at the throttle. In this way, if the pulse width needs to be changed for a given cycle to meet load or throttle position demands, the make-up pulse width can be injected or the primary pulse width can be prematurely terminated. In FIG. 4 the region designated "b" is sensed to determine instantaneous throttle position changes or load changes. The primary fuel pulse is injected generally in region "b" followed by an optional make-up pulse "c", if required.

From the foregoing it will be seen that the present invention provides a system for controlling fuel quantity injected in a fuel injection system that takes into account a plurality of physical conditions, such as the fuel intake port wall wetting history, in order to deliver the proper fuel-air mixture. The system also takes transient conditions into account, such as those caused by changes in acceleration and deceleration or changes in load on the engine. In this way fuel efficiency is maximized and pollutants are minimized.

While the invention has been described in its presently preferred embodiment, it will be understood that modifications can be made to the system described herein without departing from the spirit of the invention as set forth in the appended claims.

NOMENCLATURE

A=throttle area

Cd=throttle discharge coefficient

D-engine displacement for one cylinder $f_v$=vapor fraction of fuel spray $f_s$=suspended fuel droplet fraction $f_{lb}$=liquid fuel burn fraction $f_{sb}$=suspended fuel droplet burn fraction $K_1$=liquid flow rate factor $K_2$=time constant for fuel evaporation process on surface of the intake port.

$K_p$=filter factor $m_{ae}$=mass air flow rate at the inlet port based on speed-density $m_{at}$=mass air flow rate at the throttle $m_{tae}$=mass air flow rate at port based on predicted flow $m_f$=fuel flow rate $m_{fi}$=fuel injection rate $m_f$=mass of liquid fuel film (kg)

$m_{tf}$=Transient fuel flow rate n=number of cylinders $p_a$=ambient pressure $p_m$=manifold absolute pressure, MAP PW=theoretical pulse-width $P_{mp}$=Predicted manifold pressure $PW_{mu}$=make-up pulse-width R=ideal gas constant for air $T_m$=manifold air temperature $T_{coolant}$=coolant temperature Tr1=throttle transient trigger Tr2=Manifold pressure transient trigger $V_m$=intake manifold volume $(F/A)_{des}$=desired fuel/air ratio $V_{eff}$=volumetric efficiency γ=ratio of specific heat Δt=ignition period

What is claimed is:

1. A system for controlling fuel quantity injected in a fuel injection system for an internal combustion engine, comprising:

an engine speed sensor for reading the engine speed of said internal combustion engine;

an engine load sensor for reading the engine load of said internal combustion engine;

a fuel quantity selector coupled to said engine speed sensor and to said engine load sensor; and a history generator coupled to said fuel quantity selector for generating a fuel intake port wall wetting history in said internal combustion engine;

said history generator generating said fuel intake port wall wetting history as a function of each of the following fuel physical states:

(a) fuel vapor,
(b) fuel droplets suspended in fuel vapor, and
(c) fuel liquid, and wherein said wall wetting history is a further function of:
fuel droplet vaporization,
rue liquid flow, and
fuel burn fraction corresponding to the percentage of unburned fuel remaining in the cylinder after combustion;
said fuel quantity selector determining from said fuel intake port wall wetting history, said engine speed, and said engine load a fuel injection control signal to control said fuel quantity injected in said fuel injection system.

2. The system of claim 1 wherein said history generator generates said fuel intake port wall wetting history based on a predefined relationship among said engine speed and said engine load.

3. The system of claim 1 wherein said fuel intake port wall wetting history is established for each of a plurality of cylinders in said internal combustion engine.

4. The system of claim 1 wherein said intake port wall wetting history is based on a plurality of fuel quantity parameters of said fuel quantity injected in said internal combustion engine.

5. The system of claim 4 wherein said fuel quantity parameter is a burn fraction of said fuel quantity actually burned in said engine cylinder.

6. The system of claim 4 wherein said fuel quantity parameter is a rate of liquid fuel droplet vaporization of said fuel quantity in said intake port.

7. The system of claim 4 wherein said fuel quantity parameter is a rate of fuel vaporization of said fuel quantity from a surface of said intake port.

8. The system of claim 4 wherein said fuel quantity parameter is a rate of liquid fuel flowing in said intake port.

9. The system of claim 1 wherein said fuel quantity selector modifies said fuel injection control signal in response to a transient operation of said internal combustion engine operation.

10. The system of claim 9 wherein said modified fuel injection control signal is a function of said engine load.

11. The system of claim 9 wherein said modified control signal is a pulse width signal which is a function of manifold air temperature, manifold absolute pressure and throttle opening.

12. The system of claim 9 wherein said transient operation is detected when a piston is between approximately 9 degrees before top dead center and 111 degrees after top dead center.

13. The system of claim 11 wherein said measured operating conditions of said manifold in said combustion engine includes an air pressure, an air temperature, and an air charge.

14. The system of claim 1 wherein said fuel injection control signal is selected so that any desired air to fuel ratio is maintained during operation of said internal combustion engine.

15. The system of claim 1 wherein said fuel injection control signal is a pulse width signal (PW).

16. The system of claim 15 wherein said pulse width signal (PW) is calculated as a function of fuel injection rate, engine speed, total fuel burn fraction and desired amount of fuel.

17. The system of claim 1 wherein said engine speed reading of said internal combustion engine is a measure of a revolving rate of a crankshaft in said combustion engine.

18. A method of delivering fuel to an internal combustion engine, comprising the steps of:

(a) determining the fuel intake port wall wetting history data for a cylinder of an engine as a function of each of the following fuel physical states:
(I) fuel vapor,
(ii) fuel droplets suspended in fuel vapor, and
(iii) fuel liquid and wherein said wall wetting history is a further function of:
(iv) fuel droplet vaporization,
(v) fuel liquid flow, and
(vi) a fuel burn fraction corresponding to the percentage of unburned fuel remaining in the cylinder after combustion;

(b) measuring a plurality of engine demand characteristics;

(c) calculating a desired amount of fuel to be delivered by a fuel injector to a cylinder based upon said engine demand characteristics and said wall wetting history data;

(d) monitoring said engine demand characteristics for transient conditions after said step of measuring has been completed;

(e) modifying said desired amount of fuel to be delivered by said fuel injector if a transient condition is determined to have occurred within a predetermined time after said step of measuring is completed;

(f) delivering fuel in an amount corresponding to said desired amount of fuel as determined in steps (c) and (e).

19. The method of delivering fuel according to claim 18, further comprising the step of calculating a pulse width corresponding to said desired amount of fuel.

20. The method of delivering fuel according to claim 18, wherein said wall wetting history data includes a fraction of fuel deposited on a wall of an intake manifold and intake valves, a vapor fraction of fuel spray and a suspended fuel droplet fraction for previous engine cycles.

21. The method of delivering fuel according to claim 18, wherein steps (a) through (e) are carried out for each cylinder of the engine.

22. The method of claim 18 wherein step (a) determines said fuel intake port wall wetting history based on a past reading of said engine speed and said engine load.

23. The method of claim 18 wherein step (a) determines said fuel intake port wall wetting history based on a predefined relationship among said engine speed, said engine load, and an engine coolant temperature.

24. The method of claim 18 wherein step (a) determines said intake port wall wetting history based on a plurality of fuel quantity parameters of said fuel quantity injected in said internal combustion engine.

25. The method of claim 24 wherein said fuel quantity parameter is a burn fraction of said fuel quantity in said intake port actually burned.

26. The method of claim 24 wherein said fuel quantity parameter is a rate of liquid fuel droplet vaporization of said fuel quantity in said intake port.

27. The method of claim 24 wherein said fuel quantity parameter is a rate of fuel vaporization of said fuel quantity from a surface of said intake port.

28. The method of claim 24 wherein said fuel quantity parameter is a rate of liquid fuel flowing in said intake port.

29. The method of claim 24 wherein said fuel quantity parameter is an amount of fuel remaining in said intake port from a previous fuel quantity injected by said fuel injection system.

* * * * *